SCANNER WITH STABILIZED BLACK LEVEL OUTPUT

Filed June 15, 1964 2 Sheets-Sheet 1

INVENTOR
JOHN W. SMITH
BY Edward T. Connors
Attorney

SCANNER WITH STABILIZED BLACK LEVEL OUTPUT

Filed June 15, 1964 2 Sheets-Sheet 2

INVENTOR
JOHN W. SMITH
BY Edward T. Connors
Attorney

United States Patent Office 3,407,267
Patented Oct. 22, 1968

3,407,267
SCANNER WITH STABILIZED BLACK LEVEL OUTPUT

John W. Smith, Whitestone, N.Y., assignor to Hogan Faximile Corporation, New York, N.Y.
Filed June 15, 1964, Ser. No. 374,924
10 Claims. (Cl. 178—6.8)

ABSTRACT OF THE DISCLOSURE

A circuit arrangement for stabilizing the output scanner of a densitometer provides a reference light level during the blanking interval. This reference light level is converted into a reference pulse. An amplifier which follows the photo multiplier used for converting the light signals into electrical signals has its input biased by the charge on a capacitor. The bias level is preset. The capacitor charge is controlled by the output of a threshold amplifier connected to the output of the amplifier. Should the blanking signal exceed the predetermined threshold of the threshold amplifier, then the capacitor is discharged to control the amplifier gain accordingly. The output of the amplifier is applied to a log compression circuit whose output is displayed on a cathode ray tube.

The present invention relates to scanners of the type used in facsimile transmitters and in densitometers, and more particularly to an impreved scanner incorporating stabilizing means against voltage variations and circuit drifts which may affect the lower level of the display range of the scanner output.

In a facsimile transmitter the subject copy is scanned by an image dissector or scanner in which light is passed through, or reflected from the copy as it is moved past a scanning area. The light from sequential areas along line after line is viewed by a photocell through the scanner so as to provide an analogue type electrical signal which is transmitted to a facsimile recorder to reproduce a facsimile copy. In the facsimile transmitter the subject copy is generally scanned from top to bottom by lines extending across the subject, thus the analogue signal for each line scan generally differs from the analogue signal for the previous line.

In the densitometer, the image dissector or scanner is used to evaluate the light transmitting or reflecting characteristics of subject copy or of copies thereof. Microfilm negatives may be scanned to measure their line-to-background contrast ratio. This data is used to determine the exposure which will provide optimum reproduction.

The scanner operation of the densitometer differs from that of the facsimile transmitted in that in the densitometer there is continuous image dissection by repetitive line scan of a selected area.

In one commercial embodiment of a densitometer a construction is used in which light is passed from a source through the microfilm and projected on a twelve by sixteen inch screen. Near the center of the enlarged image on the screen is located a scanning aperture which rapidly sweeps a circular path approximately one inch in diameter.

The microfilm may be moved so that the circular scan may be of any desired portion of the microfilm image. Light from the scanning aperture is passed to an electron multiplier photocell. The electrical output from the photocell, which is representative of the varying amounts of light at the various points explored by the scanning aperture, is amplified and logarithmically compressed so that the electrical output is directly proportional to the optical density of the microfilm. The electrical output may be used to actuate various display devices such as a recorder or logic device but the information is preferably displayed on an oscilloscope screen for visual interpretation.

A reticle for the oscilloscope screen may be calibrated directly in optical density units. The scale range is between zero and infinite density, the scale being linearly calibrated between zero and 1.6. Inasmuch as the scale is direct reading, it is important that the input to the display device vary between desired levels in a precise manner.

The oscilloscope and other display devices are generally voltage responsive and thus an input thereto must be maintained at the desired precise levels by adjustment of circuit components to compensate for voltage variations and for drift such as caused by temperature changes and aging of components. Compensation has been heretofore made by manual adjustments but such adjustments are tedious and time consuming and the variations may occur without the operator noticing same and thus incorrect readings are recorded.

The present invention aims to overcome the foregoing difficulties and disadvantages by providing a stabilized output scanner which provides an input to a display device precisely controlled at a desired lower level.

In accordance with the invention this is accomplished by providing a scanner incorporating means for blocking the light to its photoelectric cell so as to produce a reference pulse of amplitude equivalent to that produced by the photocell when light is blocked therefrom, at least to a desired minimum level, such as would occur in the event the photocell were viewing a film of high density. The reference pulse is used to control the scanner output to produce a stabilized desired lower output level for an input to a display device.

The construction in accordance with the invention is advantageous in that the stabilization of the scanner is achieved in a very short time to a close tolerance.

The construction in accordance with the invention is also advantageous in that it may be incorporated with the scanner incorporating automatic means for controlling the upper level for an input to a display device as disclosed in a co-pending application of Hugh C. Ressler filed Jan. 8, 1963, and titled Scanner with Automatic Range Control, Ser. No. 250,056, now patent No. 3,192,390.

Another object of the invention is to provide a stabilized output scanner which is simple and economical in manufacture, efficient in operation, and rugged in use.

Other objects and advantages of the invention will be apparent from the following description and from the accompanying drawings which show, by way of example, an embodiment of the invention.

Figure 1:
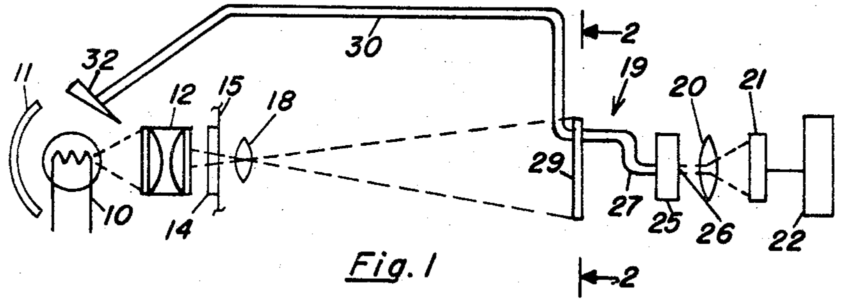
FIGURE 1 is a schematic showing of the scanner.

Referring to the drawings there is shown in FIGURE 1 a schematic drawing of a scanning mechanism such as disclosed in application Ser. No. 250,057, now Patent No. 3,192,391, filed by Hugh C. Ressler on Jan. 8, 1963. Light from a source 10 intensified by a reflector 11 is directed through condenser lens 12 to a field of scan 14 across which is placed a microfilm 15. The light transmitted by the film 15 is collected by a lens 18 and focussed on an image dissector 19 which passes light from incremental areas of the image through a lens 20 to photoelectric means such as a photomultiplier tube 21. An amplifier and output 22 is shown in block diagram in FIGURE 3.

Figure 2:
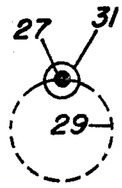
FIGURE 2 is a view of the path of the scanner fiber looking in the direction 2—2 of FIGURE 1.

The image dissector 19 includes a body member 25 rotatable by suitable means not shown. An optical fiber 26 is carried by the body member 25 and has an offset portion 27 which sweeps a circle as indicated by the dashed line 29 of FIGURE 2 upon rotation of the member 25. A second optical fiber 30 is used to transmit sampling light from the source 10 to the photoelectric means 21 as explained in the Ressler Patent No. 3,192,390. Around the end of the fiber 30 facing the first fiber offset portion 27, is a member 31 which blanks out light from the microfilm 15 for about 5 degrees of the rotation of the member 25. This provides a blanking interval during which all light is blocked from the photocell at both sides of the scan of the end of the fiber 30. A density wedge 32 may be used to adjust the light level transmitted by the fiber 30. During the scan of the end of the fiber 30 sampling light is viewed and may be used to set the maximum output of the photocell representing zero density in the microfilm as taught in the Ressler Patent No. 3,192,390.

Figure 3:
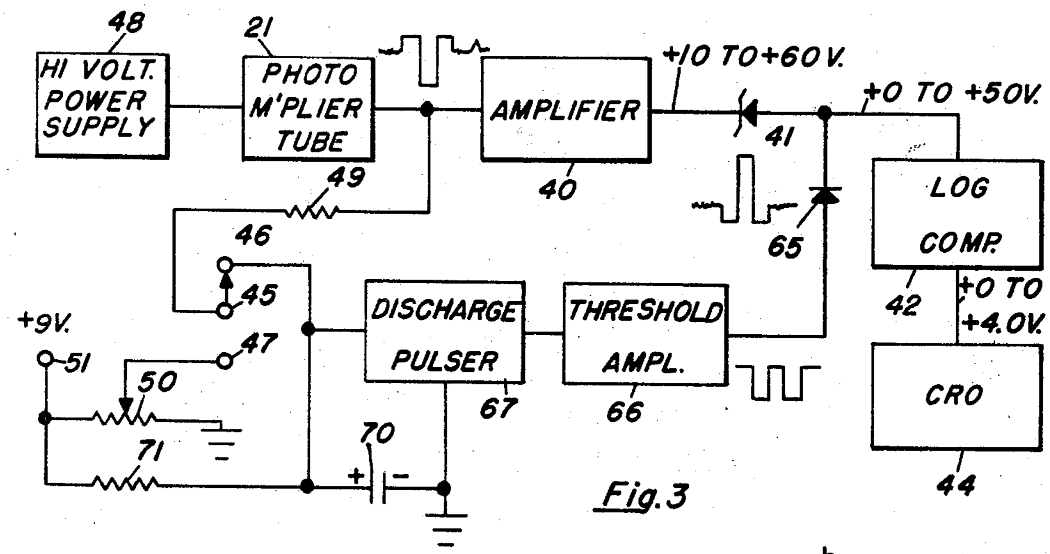
FIGURE 3 is a block diagram of the electrical circuit of the scanner.

The electrical circuit of the scanner is shown in FIGURE 3. The electric circuit of the scanner is herein described as using a double throw switch so that the scanner may be operated alternatively as manually stabilized as in the prior art, or automatically stabilized according to the teaching herein. A commercial embodiment of the scanner in accordance with the invention omits the provision for manual operation. The output of the photomultiplier tube 21 is fed to an amplifier 40 shown in further detail in FIGURE 5. The output of the amplifier 40 is passed through a Zener diode 41 to a log compression network 42 and to a display device such as a cathode ray oscilloscope 44. A double throw switch 45 having an upper contact 46 and a lower contact 47 has its midpoint connected through a resistor 49 to the output of the photomultiplier tube 21 which is provided with a high voltage supply 48. The lower contact of the switch 45 is connected through a potentiometer 50 to a positive supply 51 of about nine volts. In the event the switch 45 is closed to its lower contact 47, the scanner may be operated by adjusting the potentiometer 50 manually.

Figure 4:
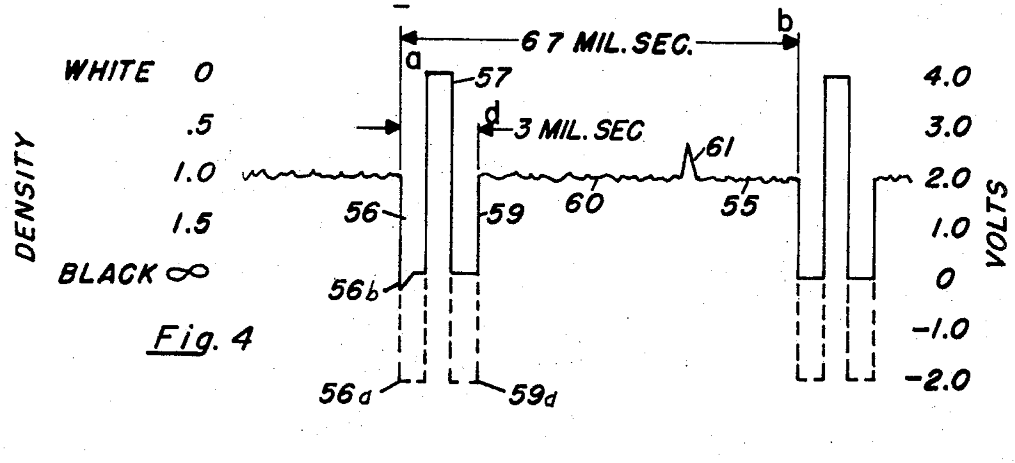
FIGURE 4 is a typical waveform shown on the oscilloscope.

The output of the scanner as viewed on the oscilloscope screen may be as typical waveform 55 shown in FIGURE 4 in which the left hand scale is in density units ranging from absolute density or full black marked "infinity" to zero density of full "white." The readings are most useful in the range between zero and 1.5. On the right a scale is shown in volts for explanation and may be omitted in a commercial embodiment.

Starting from the left hand end of the waveform 55, pulse 56 is caused by the passage of the offset end 27 of the optical fiber past the blanking member 31. Thus no light reaches the photoelectric means 21 and the output of the device is at a minimum. As the optical fiber 27 sweeps across the end of the fiber 30 there is a large pulse 57 which represents the light passed through the optical fiber 30. This pulse is optically adjusted by the use of density wedges or otherwise to produce the required output of a photomultiplier tube, equivalent to that which may be produced when the photocell views film of zero density.

It has been mentioned heretofore that the present scanner may be operated with the scanner construction shown in the Ressler Patent No. 3,192,390 which provides automatic means for maintaining the top of the pulse 57 at a desired upper level irrespective of variations in the voltage and drift resulting from the temperature or aging changes in the electrical components. However, the scanner in accordance with the present invention will operate without an automatic upper level control as taught by Ressler. In the event the upper level control is omitted, the sampling light fiber 30 may be omitted and the scanner will not produce the pulse 57.

Following the pulse 57 is another downwardly extending pulse 59 produced when the scanning fiber 27 passes the end of the fiber 30 and passes opposite the other side of the member 31 so as to produce the second pulse 59. After passing the edge of the blanking member 31 the scanning fiber 27 produces a scan of the enlarged microfilm image. The portion of the waveform indicated at 60 represents a background of density which is shown here as of density 1.0. The peak 61 represents the output of the photoelectric means as the scanner views a line on the negative, the line being of lesser density than the background and thus allowing the passage of more light to the photomultiplier tube. Obviously, there may be other peaks similar to 61 and the background density may vary depending upon the copy being scanned. The length of the scan from A to B is about 67 milliseconds for a scanning rate of 15 scans per second. The length of the blanking interval D is about 3 milliseconds which is about 5 percent of the length of the total scan.

In operating the scanner using manual adjustment with the switch 45 turned downwardly to the contact 47, the potentiometer 50 is adjusted so that the pulses 56 and 59 are maintained at the desired minimum level which in the present case is at the black or infinity level. Because of circuit variations these pulse levels may vary frequently requiring manual readjustment to reestablish the desired level.

The construction in accordance with the invention overcomes the difficulty presented by the variation in voltage and circuit components which affect the desired minimum black level by the use of automatic circuitry. In this case the switch 45 is turned to its upward position to contact 46 and brings in the circuitry including the diode 65, a threshold amplifier 66, a discharge pulser 67 and a capacitor 70. The diode 65 is adapted to pass negative pulses and thus tends to pass pulses in the event black level pulses 56 and 59 of the waveform tend to go below the infinity line. Such negative pulses as are passed by the diode 65 are amplified in the threshold amplifier 66 and actuate a discharge pulser 67 connected across capacitor 70.

The capacitor 70 is connected through a resistor 71 to the positive potential 51 and tends to acquire a charge sufficient to bias the amplifier 40 so that the black level pulses 56 and 59 tend to move downwardly to the positions 56*a* and 59*a*. However, as these pulses become more negative than the threshold of the diode 65 the discharge pulser 67 is actuated momentarily to discharge the capacitor 70. This action is very rapid generally resulting in at most a peak 56*b* on the pulse 56. Thus it may be seen that means are provided to maintain a desired lower level for the output display of the oscilloscope 44.

Figure 5:
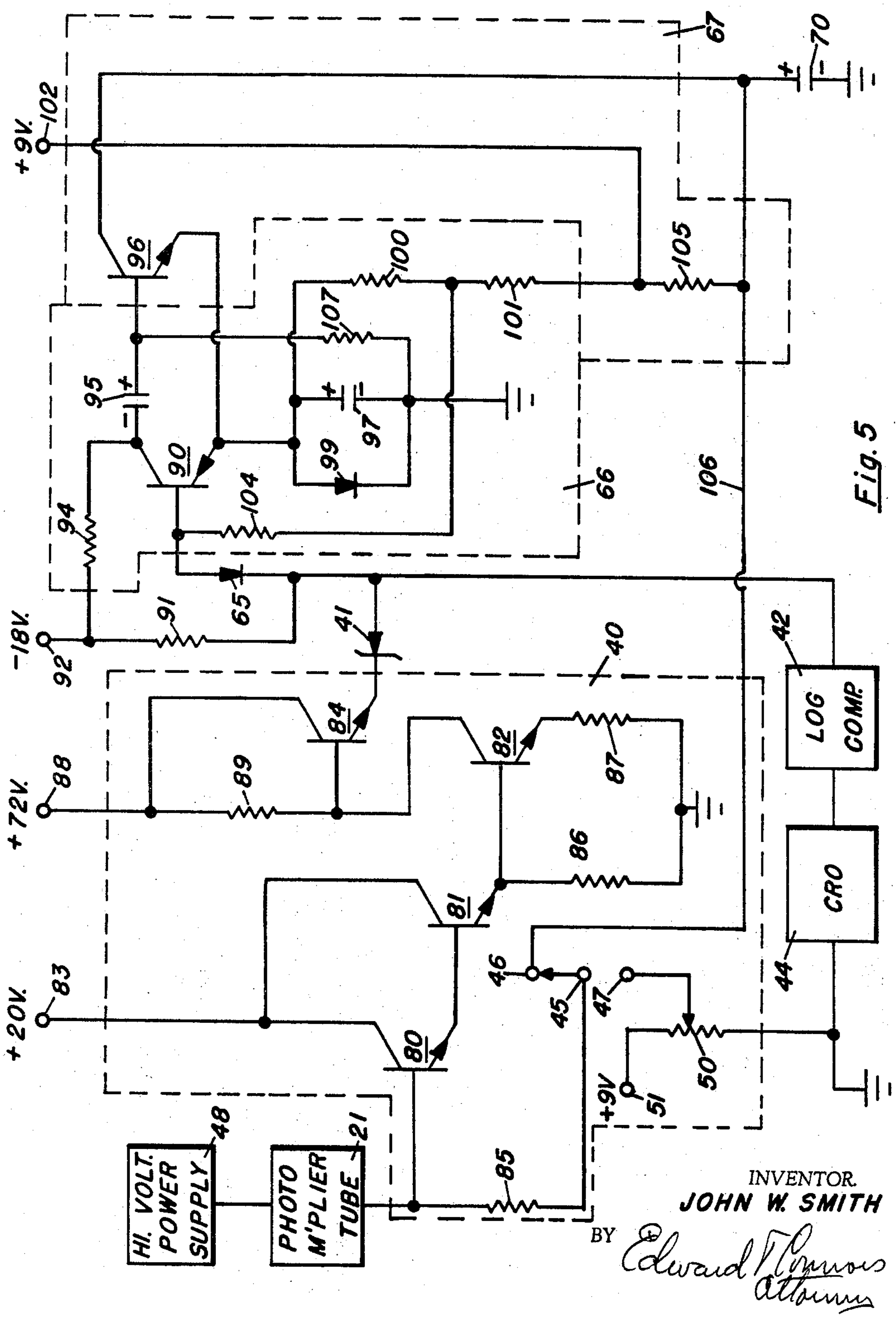
FIGURE 5 is a schematic circuit diagram amplifying the block diagram of FIGURE 3.

The schematic circuit of the block circuit diagram of FIGURE 3 is shown in FIGURE 5. Referring to FIGURE 5 the amplifier 40 includes transistors 80, 81, and 82 connected as amplifiers, transistor 82 providing phase inversion. A positive 20 volt potential 83 is provided for the collectors of transistors 80 and 81. Transistor 84 is an emitter follower used to provide a low impedance source for the following log compression network 42. The transistors 80 and 81 are cascade connected and normally biased to conductor in the absence of current drawn by the photomultiplier tube 21. The phototube draws maximum current when viewing maximum light through a zero density film and drops the potential at the base of transistor 80 causing it to lower its output and that of the transistor 81 and so decreases the output current of the transistor 82.

Biasing resistor 85 connected to the base of transistor 80 is selected in value so that its base potential will be dropped by the current drawn by the photomultiplier tube 21. Resistors 86 and 87 are emitter load resistors for transistors 81 and 82. A positive 72 volt potential 88 is provide for the collectors of transistors 82 and 84. Resistor 89 is a load for the collector of the transistor 82 and sets the potential for the base of the transistor 84. The emitter of the transistor 84 thus accurately follows the potential at its base in emitter follower action. The output of the amplifier circuit 40 so described is from the emitter of transistor 84 and swings from about plus 10 volts to plus 60 volts.

Inasmuch as the display device or oscilloscope 44 operates with one end at ground potential, means are used to reference the output of transistor 84 to ground. This is accomplished by the use of the 10 volt Zener 41. Thus the voltage swing at the anode of the Zener 41 is between zero to plus 50 volts. A bias resistor 91 is Zener diode 41 to a minus 18 volt bias 92 so as to provide the capability for the negative swing with respect to ground through the diode 65 and which produces the pulses 56*a* and 59*a* of FIGURE 4.

The transistor 90 has its collector connected through a resistor 94 to the negative supply 92 and to a coupling capacitor 95 connected to the base of discharge pulser transistor 96. The emitter of transistor 90 is directly connected to the emitter of transistor 96 and to ground by a diode 99 and through resistors 100 and 101 to a positive 9 volt supply 102. The midpoint between resistors 100 and 101 is connected through a resistor 104 for the base bias of transistor 90. The capacitor 70 is charged through a resistor 105 by the positive nine volt supply 102. Resistor 105 also provides a collector bias for transistor 96 and through feedback loop 106 a base bias for transistor 80. Base bias for transistor 96 is provided by resistor 107.

The diode 99 provides a plus bias of about .6 volt which is used to control transistor 90 so that a slight negative pulse through its base diode 65 will cause it to conduct, and as a cut off bias for transistor 96. The capacitor 97 connected to the emitters of transistors 90 and 96 stabilizes the bias. If it were not present each time transistor 96 conducted a positive pulse would be produced at the emitter of transistor 90 which would tend to turn it on and the circuit would be regenerative.

In the operation of the circuit of FIGURE 5 the photomultipler tube 21 draws current when it views light through the microfilm 15 or through the sampling light fiber optic 30. This current causes a drop through the resistor 85 lowering the current through the transistors 80, 81 and 82 and increasing the current of transistor 84 thus providing a positive pulse through the Zener 41 to the log compression network and to the oscilloscope 44. During the blanking interval when the scanning fiber 27 views the member 31 minimum current is drawn by the photomultiplier tube 21 and the transistors 80, 81 and 82 are more conducting and transistor 84 is less conducting. If the circuit is stable the output through the oscilloscope 44 should be at the desired minimum level.

The output to the oscilloscope 44 is maintained at the desired minimum level during each successive scan by the potential of the capacitor 70 applied to the base of transistor 80. If for any reason the anode of the Zener diode 41 goes negative so that the scope 44 reads below its desired minimum level or zero as the case may be, a negative pulse is drawn through the diode 65 which is amplified by the transistor 90 to turn on the threshold pulsing transistor 96 which momentarily shorts the capacitor 97 to ground through the diode 99 thereby dropping its voltage. Therefore, the output at the anode of Zener diode 41 becomes more positive and thus the scope reading is raised to the desired minimum level or zero. Because of the long time constant of the capacitor 70 and its charging resistor 105, the potential of the capacitor 70 is only gradually raised during the greater portion of the scan while the microfilm is being viewed by the scanning fiber 27. The circuit constants are so selected that an excess of potential on the capacitor 70 is quickly dissipated during the blanking interval when the discharge pulser transistor 96 is conducting.

In a commercial embodiment of a stabilized output scanner operating in a satisfactory manner circuit constants for the electric components were as follows:

Photomultiplier tube—6291
Transistor 80—2N2427
Transistor 81—TI484
Transistors 82 and 84—2N738
Transistor 90—2N321
Transistor 96—2N169A
Zener diode 41—1N3020B
Diode 65—1N484A
Diode 99—1N625
Capacitors 95 and 97—25 mfd.
Capacitor 70—100 mfd.
Potentiometer 50—100K.
Resistor 85—560K.
Resistor 86—1K.
Resistor 87—430 ohms
Resistor 89—7.5K.
Resistor 91—27K.
Resistors 94, 107, 101, 104—10K.
Resistor 100—1K.
Resistor 105—100K.

While the invention has been described and illustrated with reference to a specific embodiment thereof it will be understood that other embodiments may be resorted to without departing from the invention. For example, while the scanner has been illustrated and described as of the fiber optic type equivalent scanner structures might be used such as those of the rotating disc spiral cooperating with a fixed linear slit type and which may or may not incorporate a sampling light slit at the end of the linear slit as is known in the art. Likewise substitution may be made of the transistors and bias potential as is known in the art. Therefore, the form of the invention set out above should be considered as illustrative and not as limiting the scope of the following claims.

I claim:

1. A stabilized output scanner comprising scanning means for viewing a field of scan, photoelectric means receiving light from the field of scan through the scanning means, blanking means intercepting the light from the field of scan to the photoelectric means during a portion of each scan thereby providing a blanking interval, display means for the output of the photoelectric means, the display means incorporating amplifier means for producing an output responsive to said photoelectric means output, means for establishing a desired bias level for said amplifier means during blanking intervals, means for establishing a desired reference level for the output of said amplifier means, and means responsive to the output of said amplifier means varying from said desired reference level for altering said bias level to maintain stable the input to the display device against the variations in the drift of the photoelectric means during each scan.

2. A stabilized output scanner comprising scanning means for viewing a filed of scan, photoelectric means receiving light from the field of scan through the scanning means, blanking means intercepting the light from the field of scan to the photoelectric means during a portion of each scan thereby providing a blanking interval, display means connected to the output of the photoelectric means, the display means incorporating means for establishing a desired level display means, electric supply means, and stabilizing means incorporating a capacitor, a display device, means for applying said photoelectric means output and said capacitor output to said display device, the capacitor voltage for correcting the input to the display device against variations in the electric supply and drift of the photoelectric means during each scan.

3. A stabilized output scanner comprising scanning means for viewing a field of scan, photoelectric means receiving light from the field of scan through the scaning means, blanking means intercepting the light from the field of scan to the photoelectric means during a portion of each scan thereby providing a blanking interval, display means for the output of the photoelectric means, the display means incorporating amplifier means, means for biasing said amplifier means to a desired level to provide a desired level of display, and stabilizing means correcting the input to the display device against drift of the amplifier and photoelectric means during each scan responsive to light received by the photoelectric means during the blanking period, said means for biasing said amplifier means including capacitor storage means connected to said amplifier input, charging means for charging said capacitor during the period of scan, detecting means connected to said amplifier output for sensing when said amplifier output exceeds a predetermined reference level and producing an output signal indicative thereof, and discharge means for discharging said capacitor responsive to the output signal of said detecting means whereby the input to the amplifier is stabilized against drift of the amplifier and photoelectric means during each scan responsive to light received by the photoelectric means during the blanking period.

4. A stabilized output scanner comprising means for viewing a field of scan, photoelectric means receiving light from the field of scan, an amplifier connected to the output of the photoelectric means, oscilloscope means connected to the output of said amplifier blanking means interposed between the field of scan and the photoelectric means blocking light therebetween during at least a portion of each scan thereby providing a blanking interval, electric supply means, capacitor means connected to the amplifier input to establish a bias for the amplifier, means to charge the capacitor from said electric supply means, and pulser means responsive to the output of said amplifier exceeding a predetermined threshold for setting the voltage level of the capacitor, for biasing said amplifier to produce a desired minimum reading on the oscilloscope during the blanking interval.

5. A stabilized output scanner comprising optical fiber means for viewing a circular field of scan, photoelectric means receiving light from the field of scan through the optical fiber means, amplifier means connected to the output of the photoelectric means, and amplifier means including a plurality of amplifying stages, blanking means interposed between the field of scan and the photoelectric means blocking light therebetween during at least a portion of each scan thereby providing a blanking interval, an oscilloscope connected to the output of said amplifier means for display of the output of the photoelectric means, electric supply means, stabilizing means maintaining the amplifier output such that the oscilloscope displays a desired minimum level during the blanking interval, the stabilizing means including a threshold amplifier means connected to the output of said amplifier means to provide an output when said amplifier means output exceeds a predetermined level of said threshold amplifier means, a capacitor, means to charge the capacitor from the electric supply means to a higher than desired level, a discharge pulser means responsive to the output signal of the threshold amplifier means to discharge the capacitor to a desired level, and means connecting the capacitor to the amplifier means input to provide a bias therefor whereby the amplifier input is biased to produce a desired minimum reading on the oscilloscope during the blanking interval.

6. A stabilized output scanner comprising optical fiber means for viewing a circular field of scan, a photomultiplier tube receiving light from the field of scan through the optical fiber, amplifier means connected to the output of the photomultiplier tube, blanking means interposed between the field of scan and the photomultiplier tube blocking light therebetween during at least a portion of each scan thereby providing a blanking interval, log compression circuit means connected to the output of the amplifier, an oscilloscope connected to the output of the log compression means, electric supply means, stabilizing means maintaining the amplifier means output such that the oscilloscope displays a desired minimum level during the blanking interval, the stabilizing means including a threshold amplifier means connected to the output of said amplifier means for producing an output signal when said amplifier output exceeds a predetermined threshold, a capacitor, means to charge the capacitor from the electric supply means to a higher than desired level, a discharge pulser means responsive to signal output of the threshold amplifier means to discharge the capacitor to a desired level, and means for biasingly connecting the capacitor to the input of said amplifier means whereby the amplifier means input is biased to produce a desired minimum reading on the oscilloscope during the blanking interval.

7. A stabilized output scanner comprising optical fiber means for viewing a circular field of scan, a photomultiplier tube receiving light from the field of scan through the optical fiber, a transistor amplifier for the output of the photomultiplier tube, the amplifier including a plurality of amplifying stages, a potential dropping Zener for the amplifier output, blanking means interposed between the field of scan and the photomultiplier tube blocking light therebetween during at least a portion of each scan thereby providing a blanking interval, log compression means for the output of the amplifier, an oscilloscope connected to the output of the log compression means for providing a display of the output of said log compression means, electric supply means, stabilizing means maintaining the amplifier output such that the oscilloscope displays a desired minimum level during the blanking interval, the stabilizing means including a threshold amplifier for negative amplifier output pulses, a capacitor, means to charge the capacitor from the supply to a higher than desired level, and a discharge pulser for the capacitor responsive to negative input pulses into the threshold amplifier to discharge the capacitor to a desired level, and means connecting the capacitor to provide bias for the first stage transistor amplifier whereby the amplifier input is biased to produce a desired minimum reading on the oscilloscope during the blanking interval.

8. A stabilized output scanner comprising optical fiber means for viewing a circular field of scan, a photomultiplier tube receiving light from the field of scan through the optical fiber, a transistor amplifier for the output of the photomultiplier tube, the amplifier including a plurality of amplifying stages one of which is a phase inversion stage, a potential dropping Zener for the amplifier output, blanking means interposed between the field of scan and the photomultiplier tube blocking light therebetween during at least a portion of each scan thereby providing a blanking interval, log compression means for the output of the amplifier, an oscilloscope for display of the output of the log compression means, the oscilloscope including a reticle graduated in optical density units ranging between zero to 1.6, electric supply means, stabilizing means maintaining the amplifier output such that the oscilloscope displays a desired minimum level during the blanking interval, the stabilizing means including a threshold amplifier for negative amplifier output pulses, a capacitor, means to charge the capacitor from the supply to a higher than desired level, and a discharge pulser for the capacitor responsive to negative input pulses into the threshold amplifier to discharge the capacitor to a desired level, and feedback means connecting the capacitor to provide bias for the first stage transistor amplifier whereby the amplifier input is biased to produce a desired minimum reading on the oscilloscope during the blanking interval.

9. A stabilized output scanner comprising optical fiber means for viewing a circular field of scan, a photomultiplier tube receiving light from the field of scan through the optical fiber, a transistor amplifier for the output of the photomultiplier tube, the amplifier including a plurality of amplifying stages one of which is a phase inversion stage, a potential dropping Zener for the amplifier output, blanking means interposed between the field of scan and the photomultiplier tube blocking light therebetween during at least a portion of each scan thereby providing a blanking interval, log compression means for the output of the amplifier, an oscilloscope for display of the output of the log compression means, the oscilloscope including a reticle graduated in optical density units, electric supply means, stabilizing means maintaining the amplifier output such that the oscilloscope displays a zero level during the blanking interval, the stabilizing means including a threshold amplifier for negative amplifier output pulses, a capacitor, means to charge the capacitor from the supply to a higher than desired level, and a discharge pulser for the capacitor responsive to negative input pulses into the threshold amplifier to discharge the capacitor to a desired level, and feedback means connecting the capacitor to provide bias for the first stage transistor amplifier whereby the amplifier input is biased to produce a zero reading on the oscilloscope during the blanking interval.

10. A stabilized output scanner comprising optical fiber means for viewing a circular field of scan, a photomultiplier tube receiving light from the field of scan through the optical fiber, a transistor amplifier for the output of the photomultiplier tube, the amplifier including a plurality of amplifying stages one of which is a phase inversion stage, a potential dropping Zener for the amplifier output, blanking means interposed between the field of scan and the photomultiplier tube blocking light therebetween during at least a portion of each scan thereby providing a blanking interval, log compression means for the output of the amplifier, an oscilloscope for display of the output of the log compression means, the oscilloscope including a reticle graduated in optical density units ranging between zero to 1.6, electric supply means, stabilizing means maintaining the amplifier output such that the oscilloscope displays a zero level during the blanking interval, the stabilizing means including a threshold amplifier for negative amplifier output pulses, a capacitor, means to charge the capacitor from the supply to a higher than desired level, and a discharge pulser for the capacitor responsive to negative input pulses into the threshold amplifier to discharge the capacitor to a desired level, and feedback means connecting the capacitor to provide bias for the first stage transistor amplifier whereby the amplifier input is biased to produce a zero reading on the oscilloscope during the blanking interval.

References Cited

UNITED STATES PATENTS 3,192,390 6/1965 Ressler ------------- 250—227
3,192,391 6/1965 Ressler ------------- 250—227

ROBERT L. GRIFFIN, *Primary Examiner.*

R. K. ECKERT, Jr., *Assistant Examiner.*